United States Patent
Stuible et al.

(10) Patent No.: US 11,199,683 B2
(45) Date of Patent: Dec. 14, 2021

(54) LENS WITH A FIXED FOCAL LENGTH AND A CONSTANT STRUCTURAL LENGTH FOR AUTOFOCUS APPLICATIONS

(71) Applicant: Leica Camera AG, Wetzlar (DE)

(72) Inventors: Dietmar Stuible, Wetzlar (DE); Sigrun Kammans, Herborn (DE)

(73) Assignee: Leica Camera AG, Wetzlar (DE)

( * ) Notice: Subject to any disclaimer, the term of this patent is extended or adjusted under 35 U.S.C. 154(b) by 250 days.

(21) Appl. No.: 16/333,932

(22) PCT Filed: Sep. 18, 2017

(86) PCT No.: PCT/DE2017/100796
§ 371 (c)(1),
(2) Date: Mar. 15, 2019

(87) PCT Pub. No.: WO2018/050174
PCT Pub. Date: Mar. 22, 2018

(65) Prior Publication Data
US 2019/0212531 A1    Jul. 11, 2019

(30) Foreign Application Priority Data
Sep. 18, 2016   (DE) .................... 10 2016 117 547.1

(51) Int. Cl.
*G02B 9/64* (2006.01)
*G02B 13/00* (2006.01)
(Continued)

(52) U.S. Cl.
CPC ................ *G02B 9/64* (2013.01); *G02B 9/60* (2013.01); *G02B 13/006* (2013.01);
(Continued)

(58) Field of Classification Search
CPC ... G02B 9/60; G02B 9/62; G02B 9/64; G02B 13/04; G02B 13/0045; G02B 13/005; G02B 13/006; G02B 13/18; G02B 27/0025
(Continued)

(56) References Cited

U.S. PATENT DOCUMENTS 4,726,669 A * 2/1988 Angenieux ............ G02B 13/02
359/740
7,477,459 B2   1/2009 Liao
(Continued)

FOREIGN PATENT DOCUMENTS

JP   2007-298832 A   11/2007
JP   2011-48232 A    3/2011
(Continued)

OTHER PUBLICATIONS

International Search Report (PCT/ISA/210) issued in PCT Application No. PCT/DE2017/100797 dated Jan. 4, 2018 with English translation (five (5) pages).
(Continued)

*Primary Examiner* — Jordan M Schwartz
(74) *Attorney, Agent, or Firm* — Crowell & Moring LLP

(57) ABSTRACT

A lens with a fixed focal length, includes five lens-element groups, a first front lens-element group, a second lens-element group, a third lens-element group, a fourth lens-element group, and a fifth back lens-element group that is arranged in a stationary manner. Relative to an imaging plane in a lens barrel and both the focusing front group and the focusing back group are movable jointly relative to one another and to the lens-element groups arranged in a stationary manner in order to focus the lens on objects at
(Continued)

different object distances. The front lens-element group and the back lens-element group have a negative refractive power.

16 Claims, 8 Drawing Sheets

(51) Int. Cl.
    *G02B 27/00*     (2006.01)
    *G02B 13/04*     (2006.01)
    *G02B 9/60*     (2006.01)
    *G02B 13/18*     (2006.01)

(52) U.S. Cl.
    CPC ......... *G02B 13/0045* (2013.01); *G02B 13/04* (2013.01); *G02B 13/18* (2013.01); *G02B 27/0075* (2013.01)

(58) Field of Classification Search
    USPC .......................... 351/754–756, 761–763, 770
    See application file for complete search history.

(56) References Cited

U.S. PATENT DOCUMENTS

| | | |
|---|---|---|
| 8,619,374 B2 | 12/2013 | Abe et al. |
| 2002/0060855 A1 | 5/2002 | Ohashi |
| 2004/0017605 A1 | 1/2004 | Kasahara et al. |
| 2008/0144186 A1 | 6/2008 | Feng et al. |
| 2009/0015935 A1 | 1/2009 | Szapiel et al. |
| 2010/0157445 A1* | 6/2010 | Taki ............... G02B 13/24 359/764 |
| 2011/0096410 A1 | 4/2011 | Ryu |
| 2013/0070124 A1 | 3/2013 | Katsuyama et al. |
| 2014/0016025 A1 | 1/2014 | Kosaka |
| 2014/0146405 A1 | 5/2014 | Tsutsumi et al. |
| 2014/0184887 A1* | 7/2014 | Yonetani ........... G02B 13/0015 348/349 |
| 2014/0212123 A1 | 7/2014 | Sato |
| 2015/0247994 A1 | 9/2015 | Tomioka |
| 2015/0323764 A1* | 11/2015 | Mori ............... G02B 13/26 348/360 |
| 2016/0178875 A1* | 6/2016 | Matsumura ....... G02B 15/17 359/684 |
| 2016/0299415 A1 | 10/2016 | Minefuji |
| 2017/0192207 A1 | 7/2017 | Chen et al. |
| 2017/0374271 A1 | 12/2017 | Takao |
| 2018/0059382 A1 | 3/2018 | Noda |
| 2018/0164540 A1 | 6/2018 | Kawamura et al. |
| 2020/0192060 A1 | 6/2020 | Sawamoto |

FOREIGN PATENT DOCUMENTS

| | | |
|---|---|---|
| JP | 2012-58682 A | 3/2012 |
| JP | 2016-109810 A | 6/2016 |

OTHER PUBLICATIONS

German-language Written Opinion (PCT/ISA/237) issued in PCT Application No. PCT/DE2017/100797 dated Jan. 4, 2018 (six (6) pages).
International Search Report (PCT/ISA/210) issued in PCT Application No. PCT/DE2017/100796 dated Jan. 5, 2018 with English translation (five (5) pages).
German-language Written Opinion (PCT/ISA/237) issued in PCT Application No. PCT/DE2017/100796 dated Jan. 5, 2018 (six (6) pages).
International Search Report (PCT/ISA/210) issued in PCT Application No. PCT/DE2017/100798 dated Mar. 7, 2018 with English translation (10 pages).
German-language Written Opinion (PCT/ISA/237) issued in PCT Application No. PCT/DE2017/100798 dated Mar. 7, 2018 (eight (8) pages).
English translation of International Preliminary Report on Patentability (PCT/IB/338 & PCT/IB/373) issued in PCT Application No. PCT/DE2017/100796 dated Mar. 28, 2019, including English translation of document C4 (Japanese-language Written Opinion (PCT/ISA/237) previously filed on Mar. 15, 2019) (seven (7) pages).
U.S. Office Action issued in U.S. Appl. No. 16/333,922 dated Jan. 6, 2021 (21 pages).
U.S. Office Action issued in U.S. Appl. No. 16/333,922 dated Apr. 19, 2021 (24 pages).
U.S. Office Action issued in U.S. Appl. No. 16/333,938 dated Mar. 18, 2021 (26 pages).

* cited by examiner

LENS WITH A FIXED FOCAL LENGTH AND A CONSTANT STRUCTURAL LENGTH FOR AUTOFOCUS APPLICATIONS

BACKGROUND

The embodiments of the invention relate to an interchangeable lens with a fixed focal length. Such lenses are used for photographic image recording purposes from analog photography and are likewise used for digital image recording. To an increasing extent digital cameras no longer have a mirror which is pivotable into and out of the image recording beam path and which deflects the object field to be photographed into a viewfinder via a prism for focusing purposes and in order to select the image detail, rather the image selection is carried out by permanent image recording by means of the image recording sensor and on the basis of an object detail obtained therefrom, which is represented on a display on the rear side of the camera, or with the aid of an electronic viewfinder. The focusing of these lenses is carried out automatically with the aid of electronic autofocus signals and corresponding driving of the focusing element in the lens. Photographic lenses for producing a good imaging performance usually consist of two or more lens-element groups, which in turn have individual lens elements mounted in a stationary manner or in a displaceable manner along the optical axis. A lens-element group which is displaceable along the optical axis may be provided for the purpose of focusing the lens at different object distances. This can be for example the lens head, that is to say the front lens-element group facing the object plane, or the complete lens. Such an arrangement is also called total focusing. With this type of focusing, however, the structural length of the lens changes during focusing, which contains disadvantages with regard to tightness. Therefore, lenses are also used in which a lens element mounted in a displaceable manner in the lens, the so-called focusing element, is displaced along the optical axis. Such an arrangement is also called internal focusing. It is true that lenses of this design can be focused in wide ranges from an infinite object distance through to close range of a few meters or even centimeters, that is to say that the object is imaged sharply onto the image recording plane; however, the optical imaging performance decreases precisely at close range. Optical image aberrations such as distortion, image field curvature, aperture aberrations, chromatic aberrations and coma increase. Despite focusing at the desired object distance, the image results then often no longer satisfy the requirements in respect of the imaging performance of modern image recording systems. If a high imaging performance is nevertheless intended to be achieved, complicated and expensive lens designs having a high number of different lens elements are required. Alternatively, in order to increase the imaging performance in the case of lenses with total focusing, principally for close range, a second movable lens element may be provided, a so-called floating element, which counteracts the imaging aberrations, but for the rest has hardly any influence on the focus position.

In order to realize lenses with variable focal lengths (zoom lenses), at least two lens elements or lens-element groups which are adjustable relative to one another on curves are normally provided. The focusing is still carried out by means of a focus element that is adjustable for focusing. In the case of such lenses, accordingly, one group from two lens-element groups performs the focal length variation and, independently thereof, a further lens-element group is used for focusing.

One such lens with a variable focal length is disclosed in US 2013/0070124 A1, for example. This lens comprises three movable lens-element groups for focal length and focus variation.

U.S. Pat. No. 8,619,374 B2 discloses an interchangeable lens with a variable focal length. A stationary front lens-element group is followed by an axially adjustable lens-element group for changing the focal length. Two mutually independently adjustable focusing lens-element groups are inserted between two further stationary lens-element groups. Imaging aberrations that arise depending on the change in focal length are intended to be compensated for with the aid of the two focusing lens-element groups.

The problem addressed by the embodiments of the invention was that of making possible, in the case of interchangeable lenses with a fixed focal length, a very high constant image quality during focusing at different object distances from infinity to extremely close range at less than 30 cm or with an imaging scale of up to 1:3, wherein the lens elements required for focusing should have a simple construction with low weight in order to be able to achieve a fast and quiet autofocus drive having high accelerations. Furthermore, the lenses should be suitable for use on mirrorless recording systems with a short flange focal distance, have a short back focal distance and at the same time have a sufficiently large distance between the exit pupil of the lens and the imaging plane. For suitability for modern image sensors, the angle of incidence of light in the imaging plane, as viewed from the perpendicular, should not become too large.

SUMMARY

This problem is solved according to the embodiments of the invention by means of the inventive lens. With regard to the solution features specified in the claims it should be noted that in modern optical design use is usually made of automatic correction programs, such as e.g. "Code V" from Optical Research Associates, which are able to calculate, from predefined lens-element sequences and refractive power distributions, proposals for functional lens systems having a correction state optimized for a specific task. On the basis of targeted alterations of the specified parameters by the optical designer, the correction state automatically achieved is improved further in each case.

With the features of claim 1, it is possible in this way already to obtain the design data for radii, lens-element thicknesses, distances between lens elements, refractive indices and Abbe numbers of the optical glasses to be used. When the features specified in the dependent claims are taken into account, the design parameters can be progressively improved in a targeted manner.

Exemplary embodiments of the lens according to the invention are illustrated to scale in the drawing; design data can be gathered from the tables assigned to the respective figures. It is evident to the person skilled in the art, an optical designer, that the design complexity for lenses according to the embodiments of the invention decreases if a lower optical imaging performance is accepted in return.

The solution feature of lenses according to the embodiments of the invention consists in providing in a lens barrel two focusing lens-element groups mounted in a displaceable manner along an optical axis with respect to an imaging plane, wherein a focusing front group as viewed from the object side is arranged upstream, and a focusing back group as viewed from the object side is arranged downstream, of a stationary central group having lens elements and an aperture stop (iris diaphragm). As a result of the control of the two focusing lens-element groups jointly relative to one another and to the other lens-element groups arranged in a stationary manner in the lens barrel, the course of the image aberrations that is introduced during focusing at different object distances is advantageously mutually compensated for. In addition, a lens according to the embodiments of the invention comprises a front lens-element group, which is stationary as viewed from the object side, and a stationary back lens-element group facing the imaging plane. In this way, a lens with a fixed focal length can be realized which consists of five lens-element groups, of which three are mounted in a stationary manner and two are mounted in a displaceable manner along the optical axis for focusing purposes.

In contrast to lenses having total focusing with a floating element, in the case of the focusing according to the embodiments of the invention (also called double focusing hereinafter) the two focusing lens-element groups jointly perform the displacement of the focus position for focusing the object plane onto the imaging plane. The travel of the focusing groups for focusing from infinity to the near setting (maximum movement distance corresponds to the total travel) is limited by the mechanical structural length of the lens and the motor/drive concept of the autofocus. In this case, the ratio of the two respective total travels to one another can be one or else not equal to one. It results from design-dictated spatial limitations and can be varied in order to optimize the aberrations.

According to the embodiments of the invention, in this case the front lens-element group and the back lens-element group have a negative refractive power.

In one particular embodiment of the lenses, the focusing front group, the central group and the focusing back group have a positive refractive power, wherein the focusing front group and the focusing back group are embodied as single lens elements. However, they can in each case also be embodied as a lens-element doublet, wherein the positive total refractive power is maintained in each case.

During focusing from infinity to the near setting, the focusing elements move away from the imaging plane.

In the case of lenses for the full-frame format (image circle diameter 43.3 mm) with a short focal length, e.g. between 13 mm and 65 mm, it has been found to be advantageous to use more lens elements having a negative refractive power than a positive refractive power in the front lens-element group. In this case, the central group of the lens according to the embodiments of the invention preferably has a positive refractive power. This also ensures a variable distribution of the refractive powers in the back assembly and compliance with design stipulations arising for example from the predefined maximum external dimensions of the lens, the predefined maximum aperture and lens-element diameters and from the limiting dimensions of the camera bayonet, in particular the free internal diameter thereof.

In this way, it is possible preferably to realize a 21 mm, 24 mm, 28 mm, 35 mm or 50 mm lens, each having a maximum aperture number of 1.4 or 2.0, wherein the focal length indications in this case relate to the full-frame format (image circle diameter 43.3 mm). For the person skilled in the art it is possible, whilst complying with the parameters specified in the patent claims, to realize lenses having a smaller (down to e.g. 0.9) or larger (e.g. 4.0) maximum aperture number. With a smaller maximum aperture number the design complexity increases, which has disadvantageous effects on the lens volume, the number of lens elements required and the lens-element diameters if the optical imaging performance (aberrations) is intended not to deteriorate to an excessively great extent. With a larger maximum aperture number, by contrast, the design complexity usually decreases with the imaging performance remaining the same or being poorer.

A scaling of the geometric data of the lens to other image formats is possible with the respective maximum aperture number being maintained and brings about a corresponding scaling of the focal length. Lenses realized in this way, with design features otherwise corresponding with respect to the embodiments of the invention, are likewise the subject matter of the invention.

In one particular embodiment of the lens according to the invention, the ratio $f1/f$ of the focal lengths $f1$ of the front lens-element group and $f$ of the entire lens lies between $-40$ and $-0.3$, the ratio $f2/f$ of the focal lengths $f2$ of the focusing front group and $f$ of the entire lens lies between $0.3$ and $20$, the ratio $f3/f$ of the focal lengths $f3$ of the central group and $f$ of the entire lens lies between $0.3$ and $40$, the ratio $f4/f$ of the focal lengths $f4$ of the focusing back group and $f$ of the entire lens lies between $0.2$ and $20$, and the ratio $f5/f$ of the focal lengths $f5$ of the back lens-element group and $f$ of the entire lens lies between $-40$ and $-0.3$.

In a first step of optimizing the ratio $f1/f$, limitation to a range of between $-10$ and $-0.8$ has proved to be expedient. In order to avoid an excessive sensitivity with regard to mounting tolerances to be complied with, it is particularly advantageous to limit the ratio upwardly (small absolute values), and in order to achieve a structural size that is as compact as possible, the ratio $f1/f$ should be limited downwardly (large absolute values). An embodiment of the invention that is optimized with regard to mounting tolerances and structural size therefore has a ratio $f1/f$ of between $-5.3$ and $-1.0$ In one particular embodiment of the lens according to the invention, a reduction of the focusing travel of the focusing front group and of the structural length of the lens can be achieved by means of a limitation of the ratio $f2/f$ to a range of between $0.8$ and $15$. In general, small focusing travels are advantageous for fast focusing, but they also increase the tolerance sensitivity. On the other hand, an excessively large focusing travel firstly increases the structural length and secondly requires powerful and fast motorized drives having a high energy consumption for focusing. The limitation of the ratio $f2/f$ to a range of between $1.0$ and $8.0$ is therefore particularly advantageous for a double focusing according to the invention.

An advantageous optimization carried out in the same way for the focusing back group is manifested in the case of a limitation of the ratio $f4/f$ to a range of between $0.8$ and $10$, wherein a further optimization can be achieved by a limitation to a range of between $1.3$ and $4.2$.

An advantageous configuration of the lens elements of the central group with regard to manufacturing tolerances and structural size is achieved by means of a limitation of the ratio $f3/f$ to a range of between $0.8$ and $10$, wherein an optimization according to the embodiments of the invention resides in a ratio $f3/f$ in a range of between $1.1$ and $1.8$.

Large absolute values of the ratio $f5/f$ of the back lens element group result in a disadvantageously long structural length; with small absolute values, the lens-element group becomes sensitive with regard to mounting tolerances. An advantageous optimization therefore consists in a limitation of the ratio $f5/f$ in a range of between $-10$ and $-0.5$. Particularly in the case of lenses for mirrorless photographic cameras, in which experience shows that there are very short distances between the last lens element (located near the imaging plane) in the light direction and the imaging plane, it is advantageous to embody the angle of incidence of the light, as viewed from the perpendicular to the imaging plane, such that it is not too large. An angle of incidence of the light of less than 35° has proved to be advantageous. The lenses are thus particularly suitable for camera systems having a short flange focal distance and a short back focal distance, e.g. less than 25 mm in each case, relative to the full-frame format described above. Excessively small absolute values of the ratio f5/f therefore have a disadvantageous effect since they increase the angle of incidence of the light and vignetting thus increases. An embodiment of the lens that is optimized with regard to this problem area therefore has a value in the range of between −4.7 and −0.7 for the ratio f5/f.

In one development according to the embodiments of the invention, the lens has a ratio of the total focal length f to the image circle diameter in the imaging plane (IM) of between 0.3 and 1.5. In this way and as a result of the interaction of the refractive powers of the five lens-element groups as defined more specifically above, it is possible to realize lenses with a focal length of between 13 mm and 65 mm, relative to the full-frame format described above.

Lightweight focusing groups are advantageous for a high focusing speed. A ratio of the volume V of respectively the focusing front group and focusing back group to the image circle diameter in the imaging plane raised to the third power is less than 0.1 (V/Bd$^3$<0.1) and in particular lies below 0.08 (V/Bd$^3$<0.08). Particularly advantageously the respective focusing group has a weight of less than 10 g (grams).

The value for the relative volume of 0.08, relative to the full-frame format, then corresponds to a weight of 23.2 g in the case of a lightweight glass, such as, for example, N-PSK53A from Schott, and to a weight of 35.8 g in the case of a heavy glass, such as, for example, N-LASF31A from Schott. In the case of medium-format systems having an image circle diameter 1.5 times larger, lens-element weights of 78.3 g in the case of a lightweight glass and 120.8 g in the case of a heavy glass thus result. In the case of APS systems having an image circle diameter 1.5 times smaller, lens-element weights of 6.9 g in the case of a lightweight glass and 10.6 g in the case of a heavy glass thus result.

A low weight is advantageous for the focusing speed and has an advantageous effect on motor and noise concepts.

In one particular embodiment of the lens according to the invention, the front lens-element group consists of four lens elements, wherein the first lens element has a negative refractive power, the second lens element has a negative refractive power, the third lens element has a positive refractive power and the fourth lens element has a negative refractive power. In one advantageous configuration, the third lens element and the fourth lens element are combined to form a lens-element doublet having a positive total refractive power. One exemplary embodiment comprising a front lens-element group according to the invention is illustrated as lens 1:2 21 mm in FIG. 1 of the drawing and is described in even greater detail with reference to the drawing.

In an alternative lens, the front lens-element group consists of only three lens elements, wherein the first lens element has a negative refractive power, the second lens element has a positive refractive power and the third lens element has a negative refractive power. The lens-element radii at the second and third lens elements can advantageously be chosen such that both can be realized as a lens-element doublet, in particular as a cemented element having overall a negative refractive power. The drawing contains in this respect exemplary embodiments which are elucidated in more specific detail in FIG. 2 and FIG. 6 and which are described in even more specific detail as 1:2 24 mm and 1:2 21 mm lens.

In a further embodiment of the lens according to the invention, the front lens-element group consists of three lens elements, wherein the first lens element has a positive refractive power, the second lens element has a negative refractive power and the third lens element has a negative refractive power. The lens radii at the first and second lens elements can advantageously be chosen such that both can be realized as a lens-element doublet, in particular as a cemented element having overall a negative refractive power. FIG. 3, FIG. 4 and FIG. 7 of the drawing show corresponding exemplary embodiments which are described in even more specific detail as 1:2 35 mm and 1:2 50 mm lens.

In a further embodiment of the lens according to the invention, the front lens-element group consists of three lens elements, wherein the first lens element has a negative refractive power, the second lens element has a positive refractive power and the third lens element has a negative refractive power. In one advantageous configuration, the first lens element and the second lens element are combined to form a lens-element doublet having a positive total refractive power. The drawing contains in this respect in FIG. 5 an exemplary embodiment which is elucidated in more specific detail and which is described in even more specific detail as 1:1.4 35 mm lens.

In one advantageous embodiment, the central group consists of five lens elements, wherein the first lens element has a negative refractive power, the second lens element has a positive refractive power, the third lens element has a negative refractive power, the fourth lens element has a positive refractive power and the fifth lens element has a positive refractive power, wherein the third and fourth lens elements are combined to form a lens-element doublet having a negative or positive total refractive power. This construction of the central group is described in more specific detail together with the figures mentioned above in the description of the front lens-element groups on the basis of the exemplary embodiments for 1:2 21 mm, 1:2 24 mm and 1:2 35 mm lenses (FIG. 1, FIG. 2, FIG. 3, FIG. 7).

In an alternative embodiment, the central group consists of five lens elements, wherein the first lens element has a positive refractive power, the second lens element has a negative refractive power, the third lens element has a negative refractive power, the fourth lens element has a positive refractive power and the fifth lens element has a positive refractive power, wherein the third lens element and the fourth lens element are combined to form a lens-element doublet having a positive total refractive power. This construction of the central group is described in more specific detail together with the figures mentioned above in the description of the front lens-element groups on the basis of an exemplary embodiment for a 1:2 21 mm lens (FIG. 6).

In an alternative embodiment, the central group consists of only four lens elements, wherein the first lens element has a positive refractive power, the second lens element has a negative refractive power, the third lens element has a positive refractive power and the fourth lens element has a positive refractive power, wherein the second lens element and the third lens element are combined to form a lens-element doublet having a negative total refractive power. This central group is described in more specific detail on the basis of an exemplary embodiment together with the above-mentioned front lens-element group illustrated in FIG. 4 for a 1:2 50 mm lens.

In one advantageous embodiment, the central group consists of six lens elements wherein the first lens element has a negative refractive power, the second lens element has a negative refractive power, the third lens element has a positive refractive power, the fourth lens element has a negative refractive power, the fifth lens element has a positive refractive power and the sixth lens element has a positive refractive power, wherein the fourth lens element and the fifth lens element are combined to form a lens-element doublet having a negative total refractive power. This construction of the central group is described in more specific detail together with the figures mentioned above in the description of the front lens-element groups on the basis of an exemplary embodiment for a 1:1.4 35 mm lens (FIG. 5).

In one particular embodiment of the lens according to the invention, the back lens-element group consists of three lens elements, wherein the first lens element has a positive refractive power, the second lens element has a negative refractive power and the third lens element has a positive or negative refractive power, wherein the first lens element and the second lens element are combined to form a lens-element doublet having a negative total refractive power. This construction is particularly suitable for realizing respectively a 1:2 21 mm, 1:2 24 mm, 1:2 28 mm, 1:2 35 mm or 1:2 50 mm lens (FIG. 1, FIG. 2, FIG. 3, FIG. 4, FIG. 6, FIG. 7).

In a further embodiment of the lens, the back lens-element group consists of three lens elements, wherein the first lens element has a positive refractive power, the second lens element has a negative refractive power and the third lens element has a negative or positive refractive power. This construction is particularly suitable for a 1:1.4 35 mm lens (FIG. 5).

Particularly advantageously, for the correction of monochromatic imaging aberrations, such as aperture aberrations, coma, astigmatism, curvature and distortion, at least three of the five lens-element groups each contain a lens element having one or two aspherical surfaces, wherein the latter are preferably provided in the stationary lens-element groups.

In order to be able to ensure a short back focal distance (e.g. less than 25 mm, relative to the full-frame format) suitable for mirrorless recording systems and a position of the exit pupil that is suitable for image recording sensors, according to the embodiments of the invention the back lens-element group contains at least one lens element comprising an optical material having a refractive index ne of greater than 1.8. In this way, it is also possible to comply with limitations for the maximum diameters of the lens elements on account of limiting diameters, e.g. of a bayonet, that are predefined by the camera or image recording system. With the features mentioned above concerning the five lens-element groups, in particular concerning the back lens-element group, it is possible to realize lenses having a sufficiently large distance between the exit pupil and the imaging plane, e.g. greater than 40 mm. A small angle of incidence of the light as viewed from the perpendicular to the imaging plane, e.g. less than 35°, is ensured in this way.

In order to correct the chromatic imaging aberrations, both the central group and the front lens-element group contain at least one lens element comprising an optical material having anomalous partial dispersion (SCD) of greater than 0.07.

In order to minimize the chromatic aberrations that vary during focusing, at least one of the focusing groups contains a lens element comprising an optical material having anomalous partial dispersion (SCD) of greater than 0.07.

Lens elements having an anomalous partial dispersion have the task of correcting the wavelengths of the secondary spectrum (violet-blue wavelength range). The partial dispersion is a property of the glass material that describes the ratio of the refractive index at short wavelengths, here in the violet-blue wavelength range, to the refractive index at long wavelengths, here in the red wavelength range. In the case of glass materials having anomalous partial dispersion, said ratio deviates from that of a normal glass material defined as standard, such as e.g. N-F2, a glass manufactured by Schott.

There is a positive and a negative anomalous partial dispersion. The SCD values, either positive or negative, indicate the absolute value and thus the effect of the anomalous partial dispersion. In order to be able to utilize the anomalous partial dispersion of the glass for the chromatic correction, there is a need for a particular combination of refractive power, position of the lens element in relation to the aperture and sign of the anomalous partial dispersion of the respective lens element.

Exemplary embodiments of the lenses according to the invention for the full-frame format are illustrated schematically in the drawing and are described in more specific detail below with reference to the figures.

In this case, in the figures:

DETAILED DESCRIPTION

The movement paths of the respective lens-element groups during the focusing process are illustrated below the lens-element sections in the figures. Horizontal lines represent the positions of the lens-element groups G1, G2, G3, G4 and G5. The upper lines thereof identify the positions in the focus setting infinity, the lower lines the positions in the focus setting at the shortest object distance, and the central lines the positions in a central focus setting. The perpendicular lines are assigned to the stationary lens-element groups G1, G3 and G5, and the oblique lines to the displaceable focusing groups G2 and G4.

Figure 1:
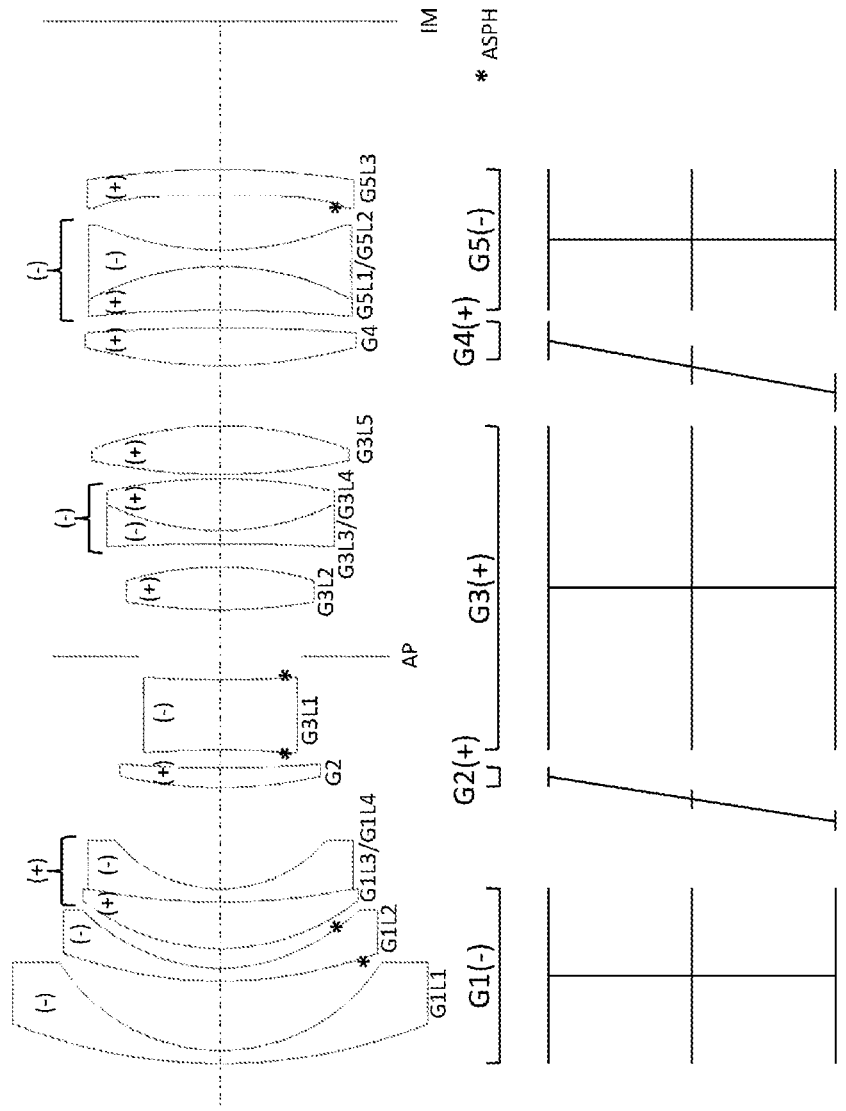
FIG. 1 shows a lens-element section through a lens with the focal length 21 mm and the maximum aperture number 2.

In the case of the lens with a focal length of 21 mm as illustrated in FIG. 1, the first lens-element group G1 comprises a convexo-concave lens element G1L1 having a negative refractive power, in the case of which the concave (inner) radius of curvature is considerably smaller than the convex (outer) radius of curvature. This results in a thin lens-element center measurable geometrically relative to the material thickness at the lens-element outer edge. A second lens element G1L2 is likewise a convexo-concave lens element having a negative refractive power and geometric relations comparable to the first lens element G1L1, but aspherical surfaces on both sides. The lens-element diameter of the second lens element G1L2 is smaller than that of the first lens element G1L1. Illustrated downstream of the second lens element G1L2 are a convexo-concave lens element G1L3 having a positive refractive power and a likewise convexo-concave lens element G1L4 having a negative refractive power, which are combined as a lens-element doublet G1L3/G1L4 having a positive total refractive power. This lens-element group G1, referred to as front lens-element group, is stationary and has overall a negative refractive power.

A second and a fourth lens-element group G2 and G4 have a positive refractive power and are displaced simultaneously for focusing along the lines indicated underneath. Both focusing elements are embodied as single lens elements, wherein the focusing front group G2 is a convexo-concave lens element and the focusing back group G4 is a biconvex lens element.

Arranged between the focusing elements is a stationary central group G3 as a lens-element group having a positive total refractive power, which in the light direction consists of a biconcave lens element G3L1 having a negative refractive power, a biconvex lens element G3L2 having a positive refractive power, a relatively thin biconcave lens element G3L3 having a negative refractive power, a biconvex lens element G3L4 having a positive refractive power and a biconcave lens element G3L5 having a positive refractive power. The biconcave lens element G3L3 having a negative refractive power and the biconvex lens element G3L4 having a positive refractive power are combined to form a lens-element doublet G3L3/G3L4 having a negative total refractive power. This central group is stationary and encloses an aperture stop (iris diaphragm) AP between the first biconcave lens element G3L1, which is embodied with aspherical surfaces on both sides, and the second biconvex lens element G3L2.

The back lens-element group G5, which is likewise stationary, has overall a negative refractive power and consists of a first concavo-convex lens element G5L1 having a positive refractive power and a second biconcave lens element G5L2 having a negative refractive power, which are joined together as a lens-element doublet (cemented element) G5L1/G5L2 having overall a negative refractive power, and a third concavo-convex lens element G5L3 having a positive refractive power that is disposed downstream in the light direction. An aspherical surface is shaped on the concave lens-element surface of the last lens element G5L3. The imaging is carried out onto an imaging plane IM.

Figure 2:
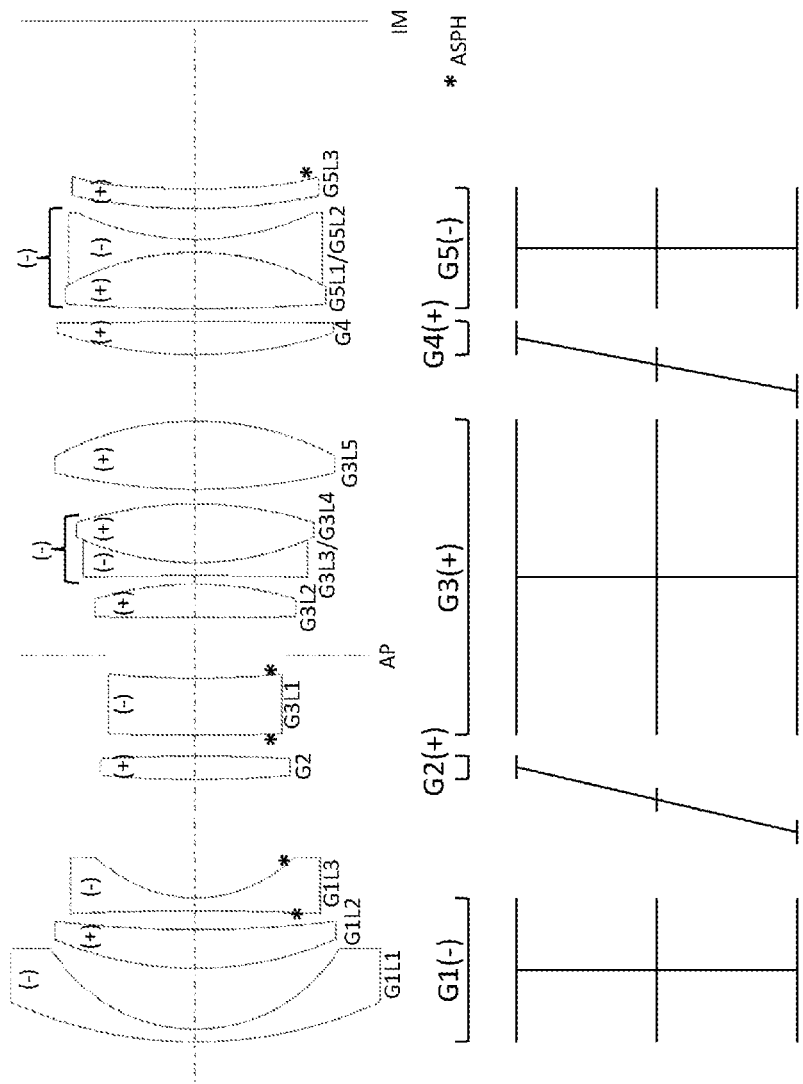
FIG. 2 shows a lens-element section through a lens with the focal length 24 mm and the maximum aperture number 2, which likewise corresponds to a lens (not illustrated in further detail) with a focal length of 28 mm and the maximum aperture number 2.

In the case of the lens with a focal length of 24 mm as illustrated in FIG. 2, the first lens-element group G1 comprises a convexo-concave lens element G1L1 having a negative refractive power, a second convexo-concave lens element G1L2 having a positive refractive power and a third biconcave lens element G1L3 having a negative refractive power, in which both surfaces are embodied as aspherical. This lens-element group G1, referred to as front lens-element group, is stationary and has overall a negative refractive power.

A second and a fourth lens-element group G2 and G4 have a positive refractive power and are displaced simultaneously for focusing along the lines indicated underneath. Both focusing elements are embodied as single lens elements, wherein the focusing front group G2 is a biconvex lens element and the focusing back group G4 is a biconvex lens element.

Arranged between the focusing elements is a stationary central group G3 as a lens-element group having a positive total refractive power, which in the light direction consists of a convexo-concave lens element G3L1 having a negative refractive power, a biconvex lens element G3L2 having a positive refractive power, a lens-element doublet G3L3/G3L4 having a negative total refractive power, consisting of a biconcave lens element G3L3 having a negative refractive power and a biconvex lens element G3L4 having a positive refractive power, and a biconcave lens element G3L5 having a positive refractive power. The lens-element group G3 encloses an aperture stop (iris diaphragm) AP between the first convexo-concave lens element G3L1, which is embodied with aspherical surfaces on both sides, and the second biconvex lens element G3L2.

The back lens-element group G5, which is likewise stationary, has overall a negative refractive power and consists of a first biconvex lens element G5L1 having a positive refractive power and a second biconcave lens element G5L2 having a negative refractive power, which are joined together as a cemented element having overall a negative refractive power, and a convexo-concave lens element G5L3 having a positive refractive power that is disposed downstream in the light direction. An aspherical surface is formed on the concave side of the final lens element G5L3. The imaging is carried out onto an imaging plane IM.

Figure 3:
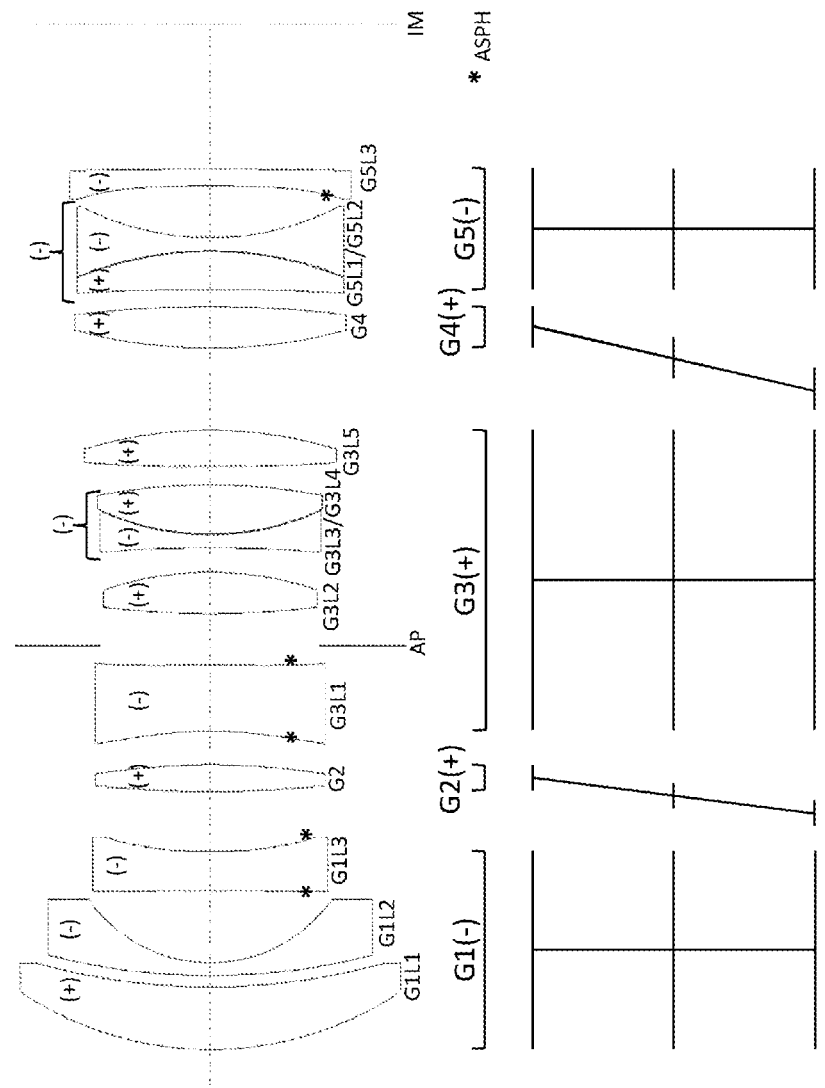
FIG. 3 shows a lens-element section through a lens with the focal length 35 mm and the maximum aperture number 2.

In the case of the lens with a focal length of 35 mm as illustrated in FIG. 3, the first lens-element group G1 comprises a first convexo-concave lens element G1L1 having a positive refractive power, a second convexo-concave lens element G1L2 having a negative refractive power and a third biconcave lens element G1L3 having a negative refractive power. In the case of the biconcave lens element G1L3, both surfaces are embodied as aspherical. This lens-element group G1, referred to as front lens-element group, is stationary and has overall a negative refractive power.

A second and a fourth lens-element group G2 and G4 have a positive refractive power and are displaced simultaneously for focusing along the lines indicated underneath. Both focusing elements are embodied as single lens elements, wherein the focusing front group G2 is a biconvex lens element and the focusing back group G4 is a biconvex lens element.

Arranged between the focusing elements is a stationary central group G3 as a lens-element group having a positive total refractive power, which in the light direction consists of a biconcave lens element G3L1 having a negative refractive power, a biconvex lens element G3L2 having a positive refractive power, a lens-element doublet G3L3/G3L4 having a negative total refractive power, consisting of a biconcave lens element G3L3 having a negative refractive power and a biconvex lens element G3L4 having a positive refractive power, and a biconvex lens element G3L5 having a positive refractive power. The lens-element group encloses an aperture stop (iris diaphragm) AP between the first biconcave lens element G3L1, which is embodied with aspherical surfaces on both sides, and the second biconvex lens element G3L2.

The back lens-element group G5, which is likewise stationary, has overall a negative refractive power and consists of a first concavo-convex lens element G5L1 having a positive refractive power and a second biconcave lens element G5L2 having a negative refractive power, which are joined together as a cemented element having overall a negative refractive power, and a second concavo-convex lens element G5L3 having a negative refractive power that is displaced downstream in the light direction. In the case of the final lens G5L3, the concave side is embodied as an aspherical surface. The imaging is carried out onto an imaging plane IM.

Figure 4:
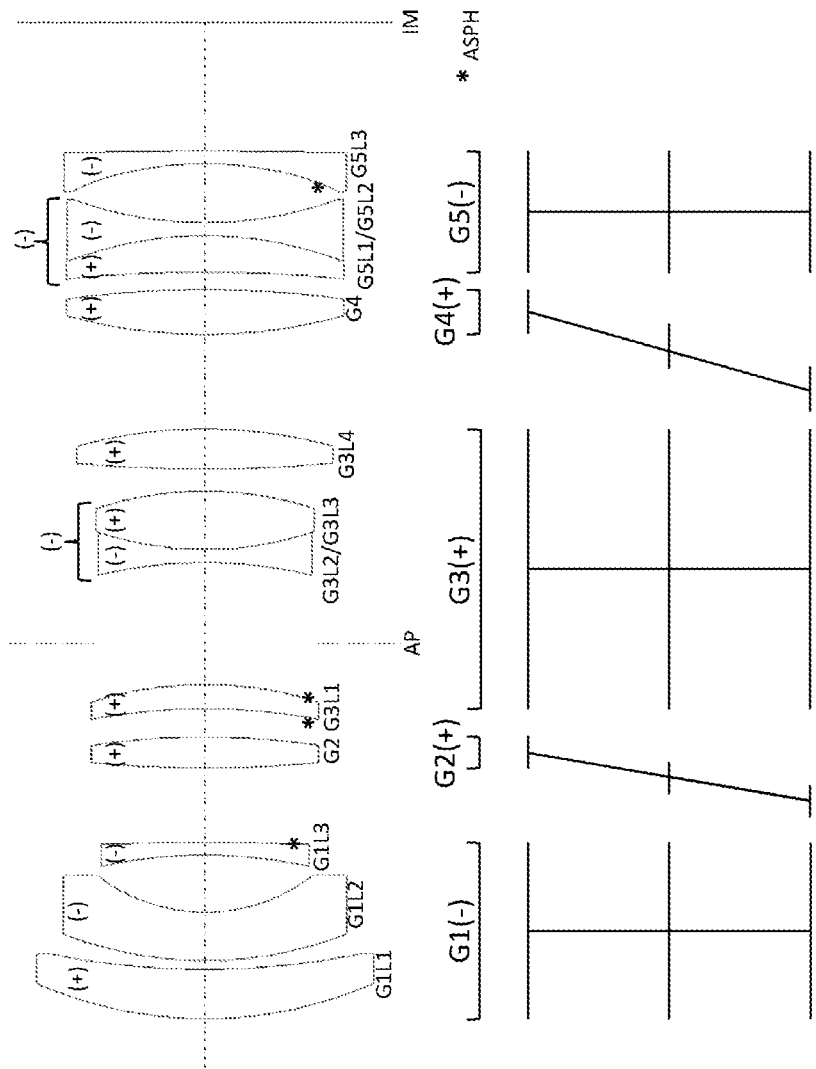
FIG. 4 shows a lens-element section through a lens with the focal length 50 mm and the maximum aperture number 2.

In the case of the lens with a focal length of 50 mm as illustrated in FIG. 4, the first stationary front lens-element group G1 having a negative total refractive power comprises a first convexo-concave lens element G1L1 having a positive refractive power, a second convexo-concave lens element G1L2 having a negative refractive power and a third concavo-convex lens element G1L3 having a negative refractive power. In the case of the concavo-convex lens element G1L3, the convex surface is embodied as aspherical.

A second and fourth lens-element group G2 and G4 have a positive refractive power and are displaced simultaneously for focusing along the lines indicated underneath. Both focusing elements are embodied as single lens elements, wherein the focusing front group G2 and the focusing back group G4 are a biconvex lens element.

Arranged between the focusing elements is a stationary central group G3 as a lens-element group having a positive total refractive power, which in the light direction is constructed from a concavo-convex lens element G3L1 having a positive refractive power and having aspherical surfaces shaped on both sides, a lens-element doublet G3L2/G3L3 having a negative total refractive power, consisting of a biconcave lens element G3L2 having a negative refractive power and a biconvex lens element G3L3 having a positive refractive power, and a biconvex lens element G3L4 having a positive refractive power. The lens-element group encloses an aperture stop (iris diaphragm) AP between the first concavo-convex lens element G3L1 and the lens-element doublet G3L2/G3L3.

The back lens-element group G5, which is likewise stationary, has overall a negative refractive power and consists of a first concavo-convex lens element G5L1 having a positive refractive power and a second biconcave lens element G5L2 having a negative refractive power, which are joined together as a lens-element doublet (cemented element) having overall a negative refractive power, and a third concavo-convex lens element G5L3 having a negative refractive power that is disposed downstream in the light direction. The concave lens-element surface of the third concavo-convex lens element G5L3 has an aspherical surface. The imaging is carried out onto an imaging plane IM.

Figure 5:
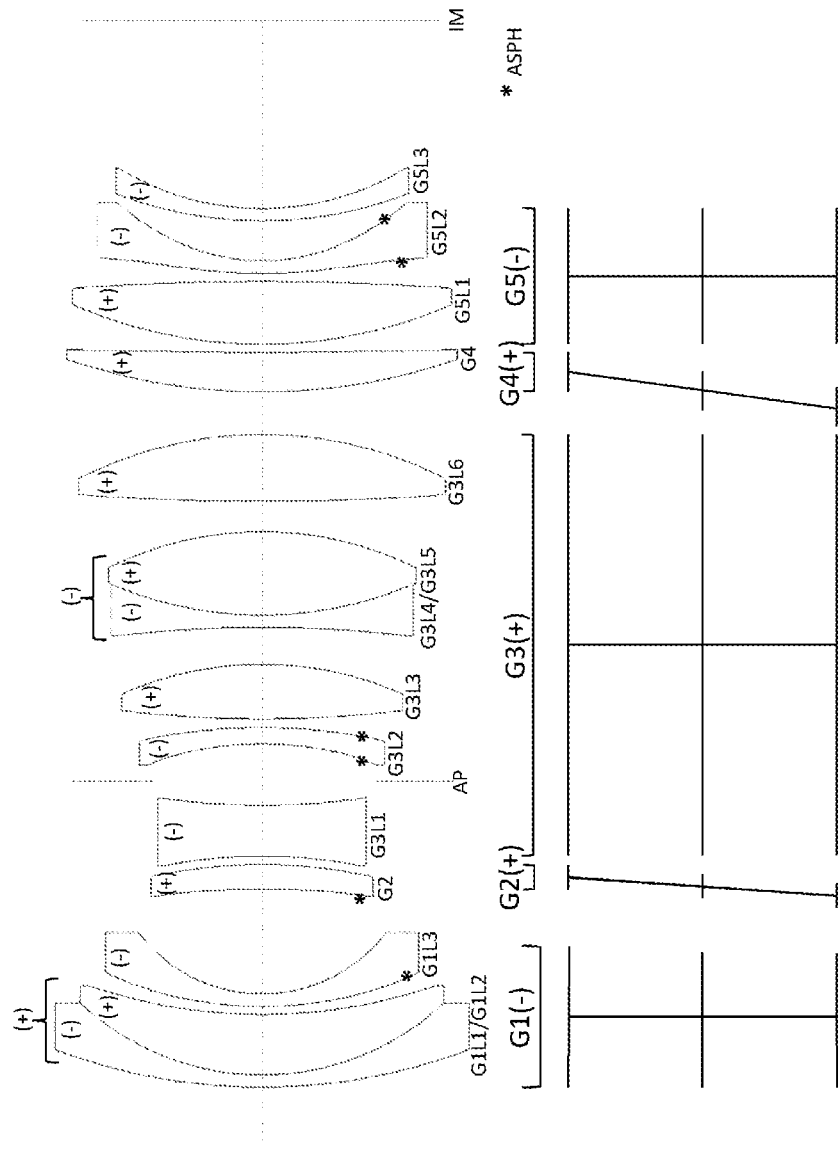
FIG. 5 shows a lens-element section through a lens with the focal length 35 mm and the maximum aperture number 1.4.

In the case of the lens with a focal length of 35 mm and a maximum aperture number of 1.4 as illustrated in FIG. 5, the stationary front lens-element group G1 having a negative total refractive power comprises a first convexo-concave lens element G1L1 having a negative refractive power, a second convexo-concave lens element G1L2 having a positive refractive power and a third convexo-concave lens element G1L3 having a negative refractive power. The radii of curvature of the first and second lens elements are chosen such that they are joined together to form a lens-element doublet (cemented element) having overall a positive refractive power. The convex lens-element surface of the third convexo-concave lens element G1L3 has an aspherical surface.

A second and a fourth lens-element group G2 and G4 have a positive refractive power and are displaced simultaneously for focusing along the lines indicated underneath. Both focusing elements are embodied as single lens elements, wherein the focusing front group G2 is a concavo-convex lens element and the focusing back group G4 is a convexo-concave lens element.

Arranged between the focusing elements is a stationary central group G3 as a lens-element group having a positive total refractive power, which consists of six lens elements G3L1, G3L2, G3L3, G3L4, G3L5, G3L6. The lens-element group comprises first a biconcave lens element G3L1 having a negative refractive power, second a concavo-convex lens element G3L2 having a negative refractive power and embodied as aspherical on both sides, and third a biconvex lens element G3L3 having a positive refractive power. The fourth biconcave lens element G3L4 having a negative refractive power is combined with the fifth biconvex lens element G3L5 having a positive refractive power to form a lens-element doublet G3L4, G3L5 having a negative total refractive power, wherein the downstream sixth biconvex lens element G3L6 has a positive refractive power. The lens-element group encloses an aperture stop (iris diaphragm) AP between the first biconcave lens element G3L1 and the concavo-convex lens element G3L2.

The back lens-element group G5, which is likewise stationary, has overall a negative refractive power and consists of a first biconvex lens element G5L1 having a positive refractive power, a second convexo-concave lens element G5L2 having a negative refractive power and having aspherical surfaces shaped on both sides, and a further convexo-concave lens element G5L3 having a negative refractive power. The imaging is carried out onto an imaging plane IM.

Figure 6:
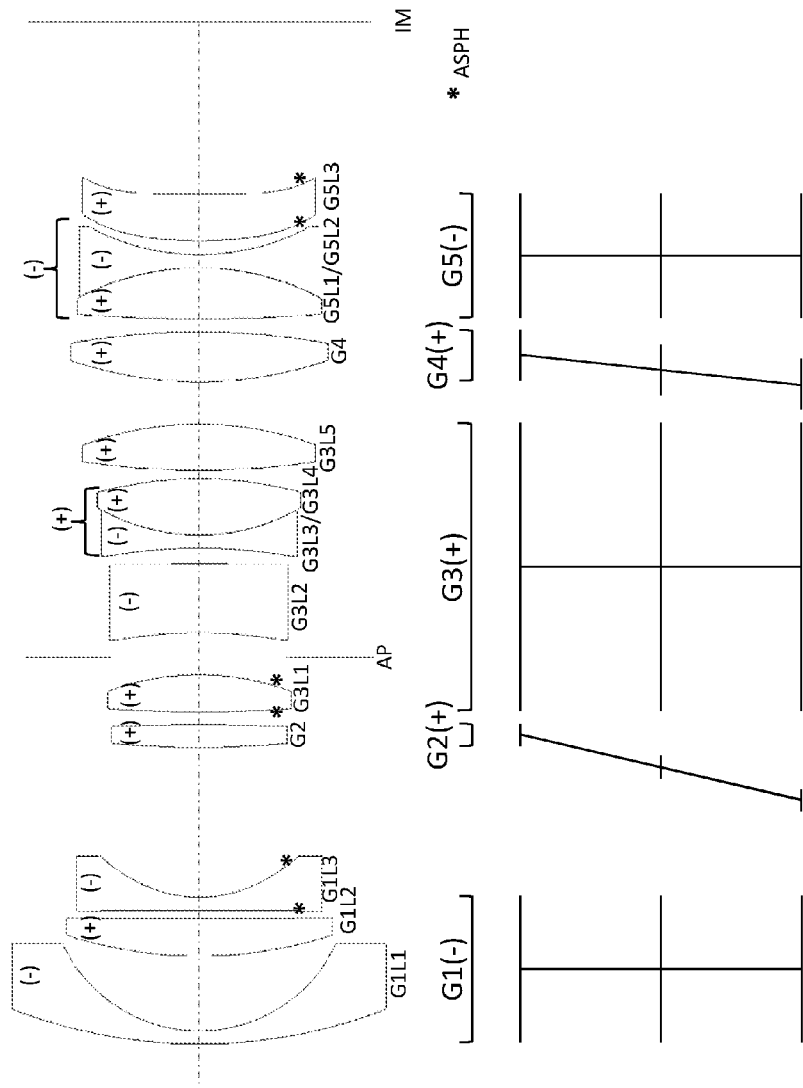
FIG. 6 shows a lens-element section through a further lens with the focal length 21 mm and the maximum aperture number 2.

In the case of the lens with a focal length of 21 mm and a maximum aperture number of 2 as illustrated in FIG. 6, the first lens-element group G1 comprises a first convexo-concave lens element G1LL having a negative refractive power, a second convexo-concave lens element G1L2 having a positive refractive power and a third biconcave lens element G1L3 having a negative refractive power, in which both surfaces are embodied as aspherical. This lens-element group G1, referred to as front lens-element group, is stationary and has a negative overall refractive power.

A second and a fourth lens-element group G2 and G4 have a positive refractive power and are displaced simultaneously for focusing along the lines indicated underneath. Both focusing elements are embodied as single lens elements, wherein both the focusing front group G2 and the focusing back group G4 are a biconvex lens element.

Arranged between the focusing elements is a stationary central group G3 as a lens-element group having a positive total refractive power, which in the light direction consists of a biconvex lens element G3L1 having a positive refractive power, a concavo-convex lens element G3L2 having a negative refractive power, a lens-element doublet G3L3/G3L4 having a positive total refractive power, consisting of a biconcave lens element G3L3 having a negative refractive power and a biconvex lens element G3L4 having a positive refractive power, and a biconvex lens element G3L5 having a positive refractive power. The lens-element group encloses an aperture stop (iris diaphragm) AP between the first biconvex lens element G3L1, which is embodied with aspherical surfaces on both sides, and the second concavo-convex lens element G3L2.

The back lens-element group G5, which is likewise stationary, has overall a negative refractive power and consists of a first biconvex lens element G5L1 having a positive refractive power and a second biconcave lens element G5L2 having a negative refractive power, which are joined together as a cemented element having overall a negative refractive power, and a convexo-concave lens element G5L3 having a positive refractive power that is disposed downstream in the light direction and is embodied with aspherical surfaces on both sides. The imaging is carried out onto an imaging plane IM.

Figure 7:
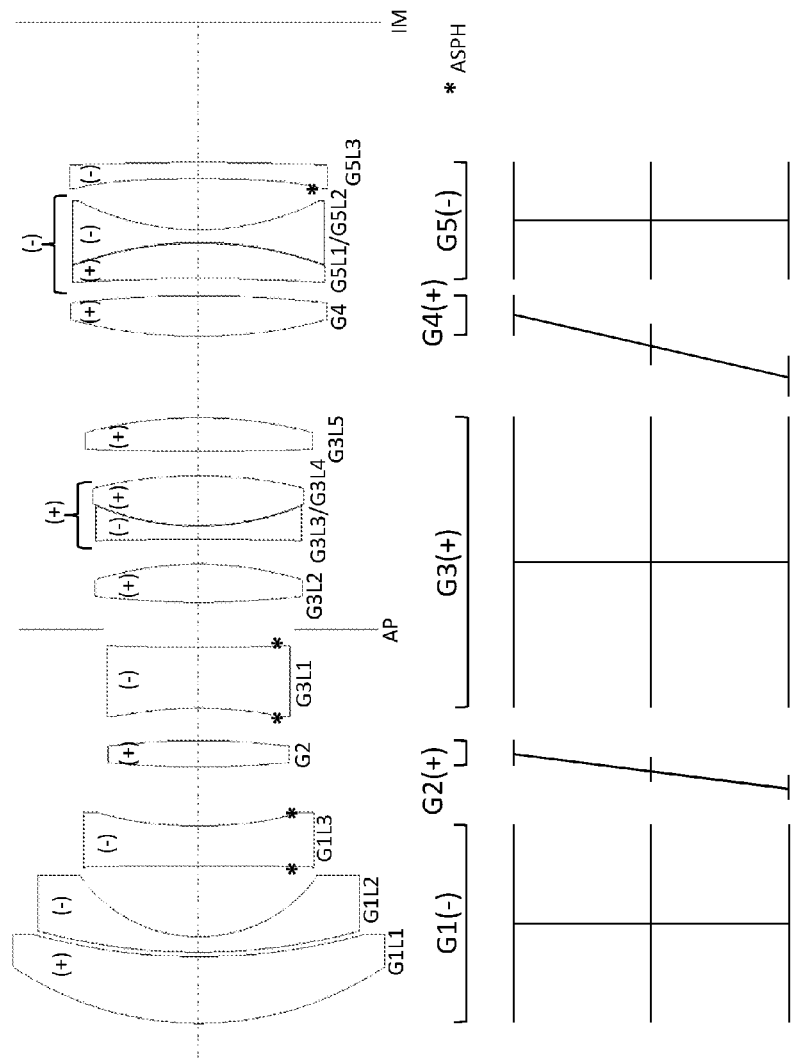
FIG. 7 shows a lens-element section through a further lens with the focal length 35 mm and the maximum aperture number 2, FIG. 8 show an image sensor in an imaging plane IM.

In the case of the lens with a focal length of 35 mm and a maximum aperture number of 2 as illustrated in FIG. 7, the first stationary front lens-element group G1 having a negative total refractive power comprises in the light direction a convexo-concave lens element G1L1 having a positive refractive power, a convexo-concave lens element G1L2 having a negative refractive power and a biconcave lens element G1L3 having a negative refractive power and having aspherical surfaces shaped on both sides.

A second and a fourth lens-element group G2 and G4 have a positive refractive power and are displaced simultaneously for focusing along the lines indicated underneath. Both focusing elements are embodied as single lens elements, wherein both the focusing front group G2 and the focusing back group G4 are biconvex lens elements.

Arranged between the focusing elements is a stationary central group G3 as a lens-element group having a positive total refractive power, which in the light direction consists of a biconcave lens element G3L1 having a negative refractive power, a biconvex lens element G3L2 having a positive refractive power, a lens-element doublet G3L3/G3L4 having a positive total refractive power, consisting of a biconcave lens element G3L3 having a negative refractive power and a biconvex lens element G3L4 having a positive refractive power, and a biconvex lens element G3L5 having a positive refractive power. The lens-element group encloses an aperture stop (iris diaphragm) AP between the first biconcave lens element G3L1, which is embodied with aspherical surfaces on both sides, and the second biconvex lens element G3L2.

The back lens-element group G5, which is likewise stationary, has overall a negative refractive power and consists of a first concavo-convex lens element G5L1 having a positive refractive power and a second biconcave lens element G5L2 having a negative refractive power, which are joined together as a lens-element doublet (cemented element) having overall a negative refractive power, and a second concavo-convex lens element G5L3 having a negative refractive power that is disposed downstream in the light direction. The concave lens-element surface of the second concavo-convex lens element G5L3 has an aspherical surface on its concave side. The imaging is carried out onto an imaging plane IM.

Figure 8:
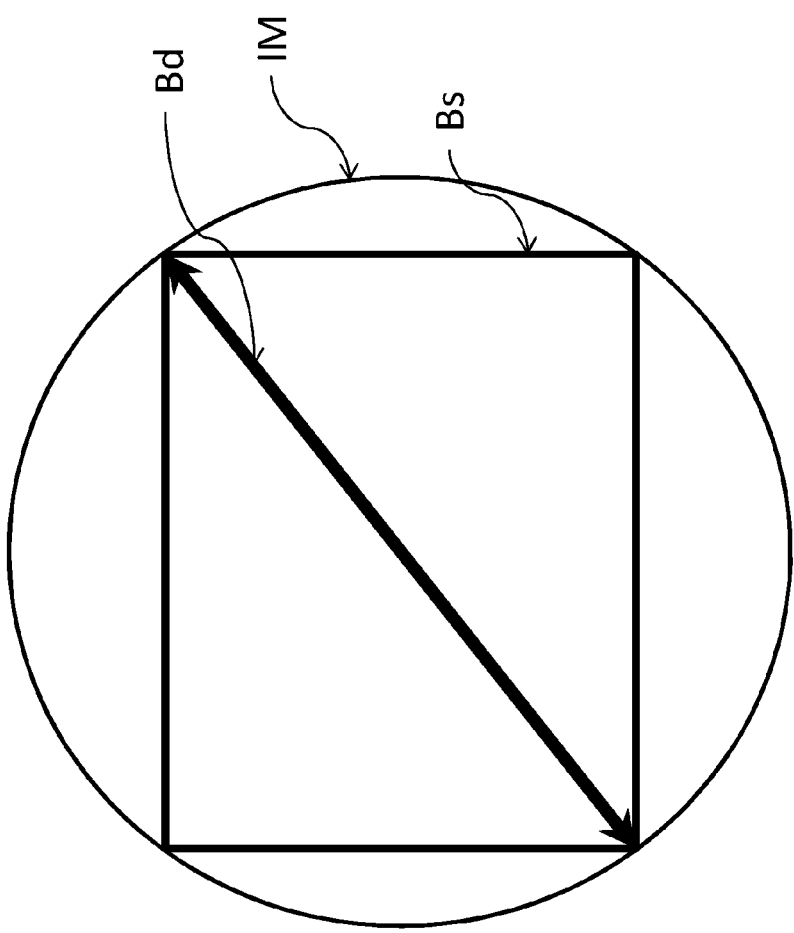

In the case of the circular imaging plane IM illustrated schematically in FIG. 8, a double-headed arrow represents an image circle diameter Bd, which corresponds to the diameter of an image sensor Bs illustrated in a rectangular fashion.

Generally, in the case of the lens-element sections, the lens-element surfaces identified by an * are embodied as aspherically curved.

The lens-element sections in the drawing are illustrated to scale, such that relative indications, such as e.g. the material thickness in the case of the lens element G1L1 in FIG. 1, which is considerably thinner in the lens-element center in comparison with the material thickness at the lens-element edge, can be diagrammatically established and checked using conventional geometric means. What is likewise disclosed in this way is that in FIG. 1 the lens element G3L1 has in the lens-element center a material thickness almost exactly three times (3.66 times) thicker than the lens element G2. These relationships are readily apparent to the person skilled in the art.

In all lens variants, the five lens-element groups described and illustrated individually represent a specifically necessary, self-contained constituent. Each of the lens-element groups can be optically tuned by itself, which is expressed in particular by the ratio of focal length specified for each lens-element group to the total focal length.

Concrete exemplary embodiments are evident from the tables below for lenses with a focal length of 21 mm, 24 mm, 35 mm and 50 mm with a maximum aperture number of 2 and a lens with a focal length of 35 mm and a maximum aperture number of 1.4, wherein the focal lengths are in each case relative to the full-frame format (43.3 mm image circle diameter).

| FIG. 1 | | | | | |
|---|---|---|---|---|---|
| 1:2 21 mm | | Refractive index ne | Abbe number ve | SCD | Refractive power [dpt.] |
| G1 | G1L1 | 1.51872 | 63.96 | −0.012 | −15.5 |
| | G1L2 | 1.48914 | 70.22 | 0.023 | −13.9 |
| | G1L3 | 1.85504 | 23.59 | 0.153 | 3.1 |
| | G1L4 | 1.48914 | 70.22 | 0.023 | |
| G2 | | 1.88815 | 40.52 | −0.107 | 13.0 |
| G3 | G3L1 | 1.85504 | 23.59 | 0.153 | −13.1 |
| | G3L2 | 1.49845 | 81.15 | 0.240 | 21.0 |
| | G3L3 | 1.72539 | 34.47 | −0.092 | −2.1 |
| | G3L4 | 1.49845 | 81.15 | 0.240 | |
| | G3L5 | 1.49845 | 81.15 | 0.240 | 19.1 |
| G4 | | 1.62033 | 63.02 | 0.082 | 13.8 |
| G5 | G5L1 | 1.93429 | 18.74 | 0.553 | −19.5 |
| | G5L2 | 1.72539 | 34.47 | −0.092 | |
| | G5L3 | 1.58547 | 59.11 | 0.010 | 6.0 |

| FIG. 2 | | | | | |
|---|---|---|---|---|---|
| 1:2 24 mm | | Refractive index ne | Abbe number ve | SCD | Refractive power [dpt.] |
| G1 | G1L1 | 1.48914 | 70.22 | 0.023 | −15.3 |
| | G1L2 | 1.85504 | 23.59 | 0.153 | 14.9 |

-continued

FIG. 2

| | 1:2 24 mm | Refractive index ne | Abbe number ve | SCD | Refractive power [dpt.] |
|---|---|---|---|---|---|
| | G1L3 | 1.48914 | 70.22 | 0.023 | −32.7 |
| G2 | | 1.88815 | 40.52 | −0.107 | 11.1 |
| G3 | G3L1 | 1.90958 | 30.78 | −0.037 | −6.2 |
| | G3L2 | 1.49845 | 81.15 | 0.240 | 13.6 |
| | G3L3 | 1.72539 | 34.47 | −0.092 | 2.8 |
| | G3L4 | 1.49845 | 81.15 | 0.240 | |
| | G3L5 | 1.49845 | 81.15 | 0.240 | 21.1 |
| G4 | | 1.62033 | 63.02 | 0.082 | 12.5 |
| G5 | G5L1 | 1.93429 | 18.74 | 0.553 | −29.4 |
| | G5L2 | 2.01169 | 28.07 | −0.054 | |
| | G5L3 | 1.58547 | 59.13 | −0.003 | 5.5 |

FIG. 3

| | 1:2 35 mm | Refractive index ne | Abbe number ve | SCD | Refractive power [dpt.] |
|---|---|---|---|---|---|
| G1 | G1L1 | 1.85504 | 23.59 | 0.153 | 11.1 |
| | G1L2 | 1.51872 | 63.96 | −0.012 | −23.1 |
| | G1L3 | 1.62409 | 36.00 | −0.001 | −13.0 |
| G2 | | 1.88815 | 40.52 | −0.107 | 17.6 |
| G3 | G3L1 | 1.69417 | 30.83 | 0.038 | −13.1 |
| | G3L2 | 1.62033 | 63.02 | 0.082 | 22.3 |
| | G3L3 | 1.65222 | 33.53 | 0.022 | −2.0 |
| | G3L4 | 1.49845 | 81.15 | 0.240 | |
| | G3L5 | 1.49845 | 81.15 | 0.240 | 12.5 |
| G4 | | 1.60520 | 65.16 | 0.072 | 14.7 |
| G5 | G5L1 | 1.93429 | 18.74 | 0.553 | −16.9 |
| | G5L2 | 1.65803 | 39.46 | −0.119 | |
| | G5L3 | 1.69661 | 52.97 | −0.069 | −2.0 |

FIG. 4

| | 1:2 50 mm | Refractive index ne | Abbe number ve | SCD | Refractive power [dpt.] |
|---|---|---|---|---|---|
| G1 | G1L1 | 1.85504 | 23.59 | 0.153 | 9.0 |
| | G1L2 | 1.62409 | 36.00 | −0.001 | −15.5 |
| | G1L3 | 1.85500 | 23.69 | 0.172 | −11.0 |
| G2 | | 1.88815 | 40.52 | −0.107 | 16.5 |
| G3 | G3L1 | 1.51872 | 63.96 | −0.012 | 4.5 |
| | G3L2 | 1.72539 | 34.47 | −0.092 | −0.9 |
| | G3L3 | 1.60520 | 65.16 | 0.072 | 14.5 |
| | G3L4 | 1.60520 | 65.16 | 0.072 | |
| G4 | | 1.60520 | 65.16 | 0.072 | 15.2 |
| G5 | G5L1 | 1.93429 | 18.74 | 0.553 | −12.7 |
| | G5L2 | 1.62409 | 36.00 | −0.001 | −12.4 |
| | G5L3 | 1.62409 | 36.00 | −0.001 | |

FIG. 5

| | 1:1.4 35 mm | Refractive index ne | Abbe number ve | SCD | Refractive power [dpt.] |
|---|---|---|---|---|---|
| G1 | G1L1 | 1.48914 | 70.22 | 0.023 | 8.9 |
| | G1L2 | 2.01169 | 28.07 | −0.054 | |
| | G1L3 | 1.49845 | 81.15 | 0.240 | −16.1 |
| G2 | | 1.88815 | 40.52 | −0.107 | 6.8 |
| G3 | G3L1 | 1.67765 | 31.85 | 0.042 | −19.6 |
| | G3L2 | 1.85504 | 23.59 | 0.153 | −6.7 |
| | G3L3 | 1.62033 | 63.02 | 0.082 | 19.2 |
| | G3L4 | 1.73429 | 28.23 | 0.074 | 2.8 |

-continued

FIG. 5

| | 1:1.4 35 mm | Refractive index ne | Abbe number ve | SCD | Refractive power [dpt.] |
|---|---|---|---|---|---|
| | G3L5 | 1.49845 | 81.15 | 0.240 | |
| | G3L6 | 1.49845 | 81.15 | 0.240 | 11.7 |
| G4 | | 1.62033 | 63.02 | 0.082 | 7.8 |
| G5 | G5L1 | 1.93429 | 18.74 | 0.553 | 19.1 |
| | G5L2 | 1.85504 | 23.59 | 0.153 | −21.8 |
| | G5L3 | 1.69417 | 30.83 | 0.038 | −6.5 |

FIG. 6

| | 1:2 21 mm | Refractive index ne | Abbe number ve | SCD | Refractive power [dpt.] |
|---|---|---|---|---|---|
| G1 | G1L1 | 1.48914 | 70.22 | 0.023 | −19.8 |
| | G1L2 | 1.85504 | 23.59 | 0.153 | 16.3 |
| | G1L3 | 1.48914 | 70.22 | 0.023 | −32.6 |
| G2 | | 1.49845 | 81.15 | 0.240 | 6.0 |
| G3 | G3L1 | 1.62287 | 60.03 | 0.011 | 24.9 |
| | G3L2 | 1.92336 | 31.38 | −0.064 | −12.5 |
| | G3L3 | 1.65803 | 39.46 | −0.119 | 2.0 |
| | G3L4 | 1.62033 | 63.02 | 0.082 | |
| | G3L5 | 1.49845 | 81.15 | 0.240 | 18.1 |
| G4 | | 1.62033 | 63.02 | 0.082 | 20.7 |
| G5 | G5L1 | 1.93429 | 18.74 | 0.553 | −35.2 |
| | G5L2 | 2.01169 | 28.07 | −0.054 | |
| | G5L3 | 1.58547 | 59.11 | 0.010 | 10.9 |

FIG. 7

| | 1:2 35 mm | Refractive index ne | Abbe number ve | SCD | Refractive power [dpt.] |
|---|---|---|---|---|---|
| G1 | G1L1 | 1.85504 | 23.59 | 0.153 | 11.1 |
| | G1L2 | 1.51872 | 63.96 | −0.012 | −22.7 |
| | G1L3 | 1.62409 | 36.00 | −0.001 | −13.1 |
| G2 | | 1.88815 | 40.52 | −0.107 | 17.6 |
| G3 | G3L1 | 1.69417 | 30.83 | 0.038 | −15.3 |
| | G3L2 | 1.62033 | 63.02 | 0.082 | 20.5 |
| | G3L3 | 1.65222 | 33.53 | 0.022 | 3.1 |
| | G3L4 | 1.49845 | 81.15 | 0.240 | |
| | G3L5 | 1.49845 | 81.15 | 0.240 | 11.0 |
| G4 | | 1.60520 | 65.16 | 0.072 | 14.7 |
| G5 | G5L1 | 1.93429 | 18.74 | 0.553 | −18.2 |
| | G5L2 | 1.65803 | 39.46 | −0.119 | |
| | G5L3 | 1.69661 | 52.97 | −0.069 | 0.6 |

What is claimed is:

1. A lens system with a fixed focal length, comprising:
five lens groups, wherein three lens groups are mounted in a stationary manner and two lens groups are mounted in a displaceable manner along an optical axis, wherein the lens system comprises the following lens groups in order from an object side of the lens system to an image side,
a first lens group as viewed from an object side is arranged in a stationary manner,
a second lens group configured as a focusing front group is arranged in a displaceable manner,
a third lens group containing a stationary iris diaphragm, the aperture of which is adjustable, configured as a lens group that is arranged in a stationary manner,
a fourth lens group configured as a focusing back group is arranged in a displaceable manner, and
a fifth lens group is arranged in a stationary manner, and wherein
relative to an imaging plane in a lens barrel both the focusing front group and the focusing back group are movable jointly relative to one another and to the lens groups arranged in a stationary manner in order to focus the lens on objects at different object distances, and the first lens group and the fifth lens group each have a negative refractive power, and
the first lens group is the most object side lens group within the lens system, and there are no intervening lens groups between the first lens group and the second lens group.

2. The lens system as claimed in claim 1, wherein the focusing front group, the third group and the focusing back group each have a positive refractive power.

3. The lens system as claimed in claim 2, wherein both the focusing front group and the focusing back group move away from the imaging plane during focusing from infinity to the near setting.

4. The lens system as claimed in claim 3, wherein
the ratio f1/f of the focal lengths f1 of the first lens group and f of the entire lens system lies between −40 and −0.3,
the ratio f2/f of the focal lengths f2 of the focusing front group and f of the entire lens system lies between 0.3 and 20,
the ratio f3/f of the focal lengths f3 of the third lens group and f of the entire lens system lies between 0.3 and 40,
the ratio f4/f of the focal lengths f4 of the focusing back group and f of the entire lens system lies between 0.2 and 20,
the ratio f5/f of the focal lengths f5 of the fifth lens group and f of the entire lens system lies between −40 and −0.3.

5. The lens system as claimed in claim 4, wherein the lens system has a ratio of the total focal length f to the image circle diameter in the imaging plane of between 0.3 and 1.5.

6. The lens system as claimed in claim 5, wherein the ratio V of the volume of the focusing front group and focusing back group to the image circle diameter (Bd) in the imaging plane raised to the third power lies below 0.1 (V/Bd$^3$<0.1), or the weight of each of the focusing front group and the focusing back group lies below 15 g.

7. The lens system as claimed in claim 6, wherein either
the first lens group consists of three negative lens elements and one positive lens element, with a positive lens and a negative lens being combined to form a lens doublet having a positive total refractive power, or
the first lens group consists of two negative lens elements and one positive lens element, or
the first lens group consists of two negative lens elements and one positive lens element, with a negative lens and a positive lens being combined to form a lens doublet having a positive total refractive power.

8. The lens system as claimed in claim 7, wherein either
the third lens group consists of three positive lens elements and two negative lens elements with a negative lens and positive lens being combined to form a lens doublet having a negative or positive total refractive power, or
the third lens group consists of three positive lens elements and two negative lens elements, with a negative lens and a positive lens being combined to form a lens doublet having a positive total refractive power, or
the third lens group consists of three positive lens elements and one negative lens element, with a negative lens and a positive lens being combined to form a lens doublet having a negative total refractive power, or
the third lens group consists of three positive lens elements and three negative lens elements, with a negative lens and a positive lens being combined to form a lens doublet having a negative total refractive power.

9. The lens system as claimed in claim 8, wherein
the first lens group consists of a first lens element, a second lens element, a third lens element, and a fourth lens element in this other from an object side to an image side, and
either the fifth lens group consists of a positive lens, a negative lens, and a third lens of positive or negative refractive power, wherein the positive lens and the negative lens are combined to form lens doublet having a negative total refractive power, or
the fifth lens group consists of two positive lenses and a negative lens.

10. The lens system as claimed in claim 9, wherein at least three of the five lens groups contain a lens element having one or two aspherical surfaces.

11. The lens system as claimed in claim 10, wherein the fifth lens group contains at least one lens element comprising an optical material having a refractive index ne of greater than 1.8.

12. The lens system as claimed in claim 11, wherein the third lens group contains at least one lens element comprising an optical material having anomalous partial dispersion SCD of greater than 0.07.

13. The lens system as claimed in claim 12, wherein the first lens group contains at least one lens element comprising an optical material having anomalous partial dispersion SCD of greater than 0.07.

14. The lens system as claimed in claim 13, wherein the focusing front group and the focusing back group contain a lens element comprising an optical material having anomalous partial dispersion SCD of greater than 0.07.

15. The lens system as claimed in claim 13, wherein at least one of each of the focusing front group and focusing back group contains a lens element comprising an optical material having anomalous partial dispersion SCD of greater than 0.07.

16. The lens system as claimed in claim 13, wherein the focusing front group or the focusing back group contains a lens element comprising an optical material having anomalous partial dispersion SCD of greater than 0.07.

* * * * *